Figure 1:
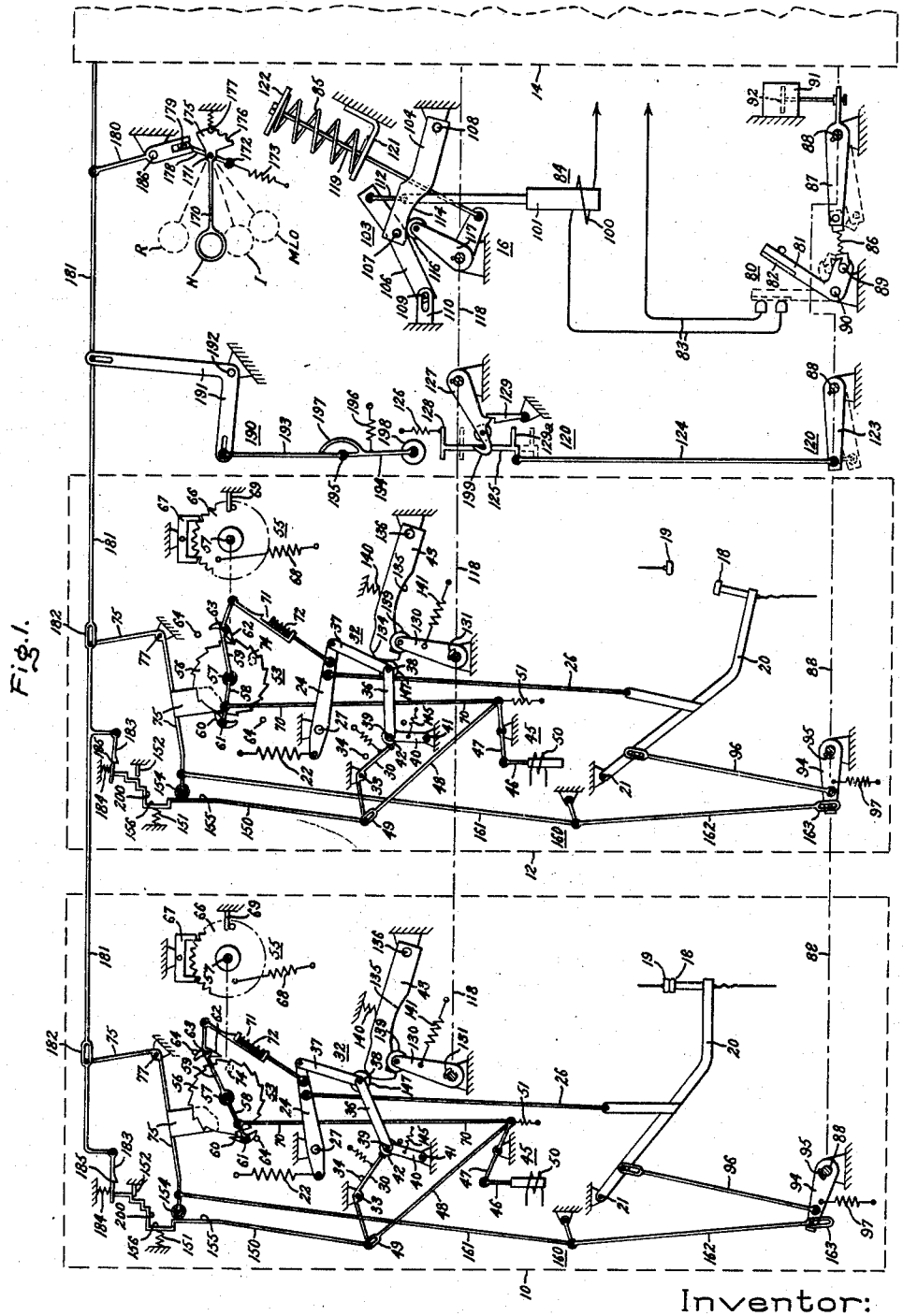

June 22, 1965     E. J. FRANK     3,191,096
AUTOMATIC RECLOSING CIRCUIT BREAKER
Filed Aug. 12, 1955     3 Sheets-Sheet 1

Inventor:
Edward J. Frank,
by J. Wesley Haulser
His Attorney.

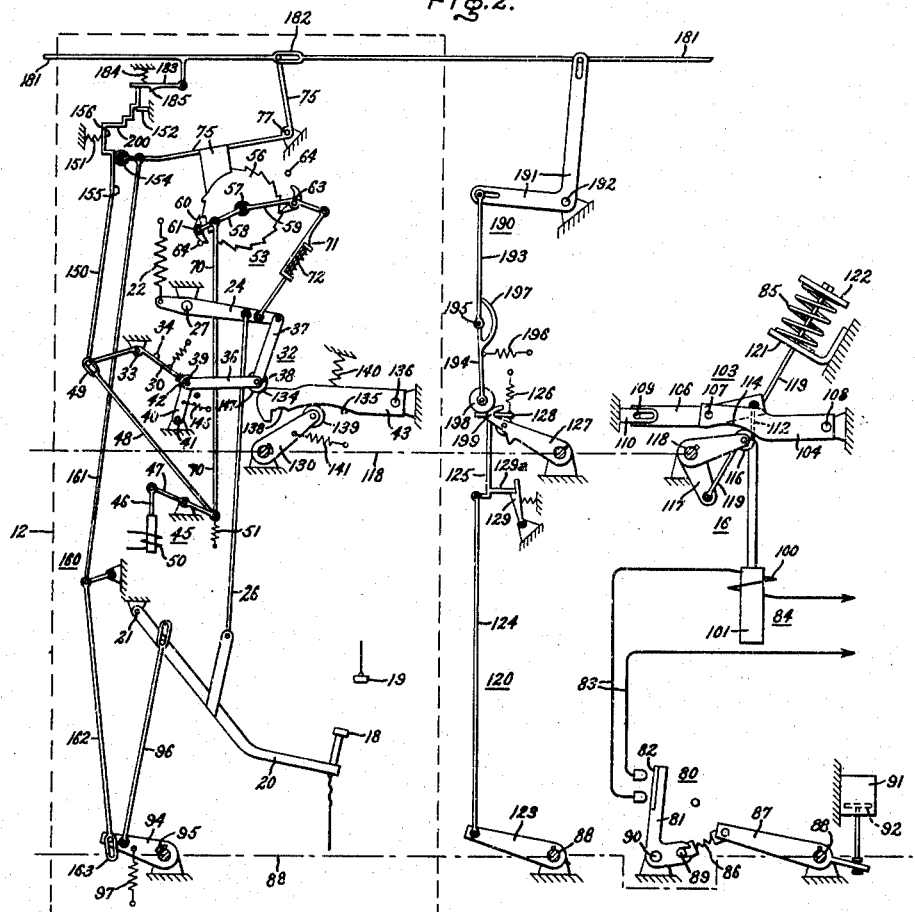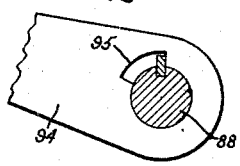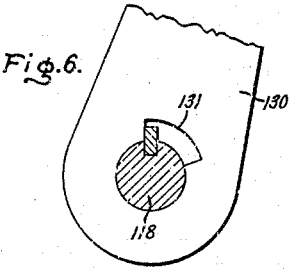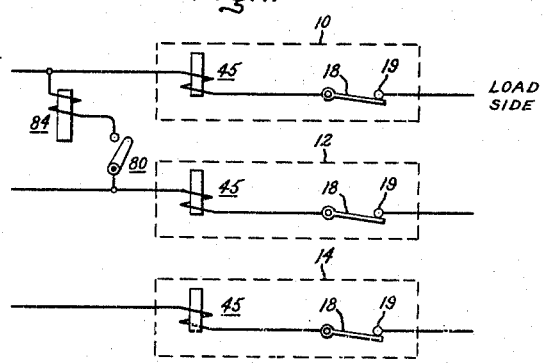

June 22, 1965

E. J. FRANK 3,191,096

AUTOMATIC RECLOSING CIRCUIT BREAKER

Filed Aug. 12, 1955

3 Sheets-Sheet 3

Inventor:
Edward J. Frank,
by J. Wesley Naulner
His Attorney.

United States Patent Office 3,191,096
Patented June 22, 1965

3,191,096
AUTOMATIC RECLOSING CIRCUIT BREAKER
Edward J. Frank, Springfield, Pa., assignor to General Electric Company, a corporation of New York
Filed Aug. 12, 1955, Ser. No. 527,894
37 Claims. (Cl. 317—22)

This invention relates to an automatic reclosing circuit breaker and, more particularly, to a polyphase type of automatic reclosing circuit breaker.

The invention has special, though not exclusive, application to the type of polyphase breaker wherein the several phases, or pole-units, of the breaker are capable of operating independently of each other so that for circuit abnormalities involving only one phase conductor of the circuit, only the pole unit in series with this one phase conductor is opened and reclosed. As is common in this type of reclosing circuit breaker, each of the pole units is provided with lock-out means for locking its particular pole unit in open-circuit position in response to a predetermined series of quickly successive operations of the pole unit, the occurrence of which indicates that the abnormality is of a permanent nature. In certain applications, it is desirable to carry out this lock-out operation, as well as the opening and reclosing operations, without disturbing the other pole units. Thus, if the phase conductors controlled by these other pole units are unaffected by the circuit abnormality, service may be continued thereover. Of course, if these other phase conductors are affected by this or a subsequent abnormality, then these other pole units should also be capable of opening, reclosing, and if required, locking-out.

From an economics viewpoint, it is desirable to perform all of the above-desired reclosing operations by utilizing only a single motive device common to all of the pole-units. Since lock-out is conventionally achieved by disabling the reclosing motive device, it will be apparent that, unless some non-conventional lock-out scheme is utilized, then a common motive device would no longer be capable of operating the other pole units after one of the units had locked-out.

Accordingly, an object of this invention is to provide new and improved lock-out means for an automatic reclosing circuit breaker.

Another object is to provide, in an automatic reclosing circuit breaker of the type having a plurality of separately-operable pole-units and a single reclosing motive device common to all of the pole-units, lock-out means which is operable to automatically lock-out any desired one of the pole-units without disabling the common motive device. By attaining this object, it becomes possible, even after lock-out of one or more of the pole-units, to continue utilizing the common motive device for controlling the remaining non-locked-out pole-units or unit.

Another object is to provide an automatic reclosing circuit breaker which requires for reclosing no source of electrical energy other than the main power circuit in which the breaker is connected, whereby to eliminate the need for separate sources of control power. This is accomplished by providing an electroresponsive closing device and a control switch therefor which, in response to a breaker opening operation, connects the closing device for a short interval across two phases of the power circuit.

If an across-the-line, or potential, type of electroresponsive closing device is utilized for directly closing a breaker and if a fault is present on the line at the time of closing, there is a danger that the closing device will be deprived of power at the instant current begins to flow between the breaker contacts. This can result in a harmful loss of closing power at the instant power is most needed. Accordingly, another object of my invention is to construct the breaker in such a manner that, even though it uses an across-the-line type of closing device, there is no diminution of closing power near the end of a closing operation when the breaker is closed on a fault.

Another object is to provide an energy accumulator which is charged by means of an electroresponsive device, which discharges to close the circuit breaker in response to deenergization of the electroresponsive device, and which requires no discharge-controlling latches or over-center arrangements in order to respond in this desired manner.

Another object is to insure that premature deenergization of the electroresponsive device, such as may result from accidental loss of control power, does not cause the energy accumulator to drive the breaker contacts toward closed position with insufficient power to insure completion of this contact-closing operation.

Another object is to hold any non-tripped pole unit in closed position by a novel detent arrangement which avoids the need for the usual space-consuming hold-closed prop.

Another object is to provide the breaker with a single manually-controllable handle which, upon appropriate operation, is capable of either causing immediate lock-out of the breaker, of causing lock-out on the first automatic opening operation, or of restoring the breaker to closed position after lock-out thereof.

In a preferred embodiment of my invention, each of the pole units comprises separable, biased-apart contacts and a trip-free linkage for transmitting closing thrust to the contacts. Cooperating with each linkage is a trip latch which normally maintains the linkage in a thrust-transmitting condition, but is movable to a tripped position to render the linkage incapable of transmitting closing thrust to the contacts. Common reclosing motive means operable to apply closing thrust to any one of said linkages is caused to operate in response to opening of any one of said pole units. Normally-inoperative lock-out means individual to each pole unit is rendered operative in response to a predetermined series of quickly successive opening operations. In its operative condition, this lock-out means holds the latch of its pole unit in a tripped position and also renders the common reclosing motive means incapable of responding to opening of that particular pole unit. However, the motive means continues to be responsive to opening of the remaining non-locked-out pole units and operates to reclose such units without reclosing the locked-out unit, which is prevented from closing by reason of its latch being held tripped by its then-operative lock-out means.

My invention in its preferred embodiment also includes an electroresponsive device operable upon opening of any one of the pole units to charge an energy accumulator, which in response to deenergization of the electroresponsive device, discharges to reclose the pole unit. Since each of the pole units comprises a trip-free linkage which is prevented from resetting into a thrust-transmitting condition until near the end of a charging operation, any premature deenergization of the electroresponsive device will not result in closing thrust being applied to the contacts of the then-open pole unit. This insures that the contacts will not be driven toward closed position with insufficient power to insure completion of this contact-closing operation. When the trip-free linkage is reset near the end of the charging operation by means responsive to completion of a predetermined portion of the charging operation, the linkage then becomes capable of transmitting closing thrust from the accumulator to the contacts of the pole unit.

Figure 3:
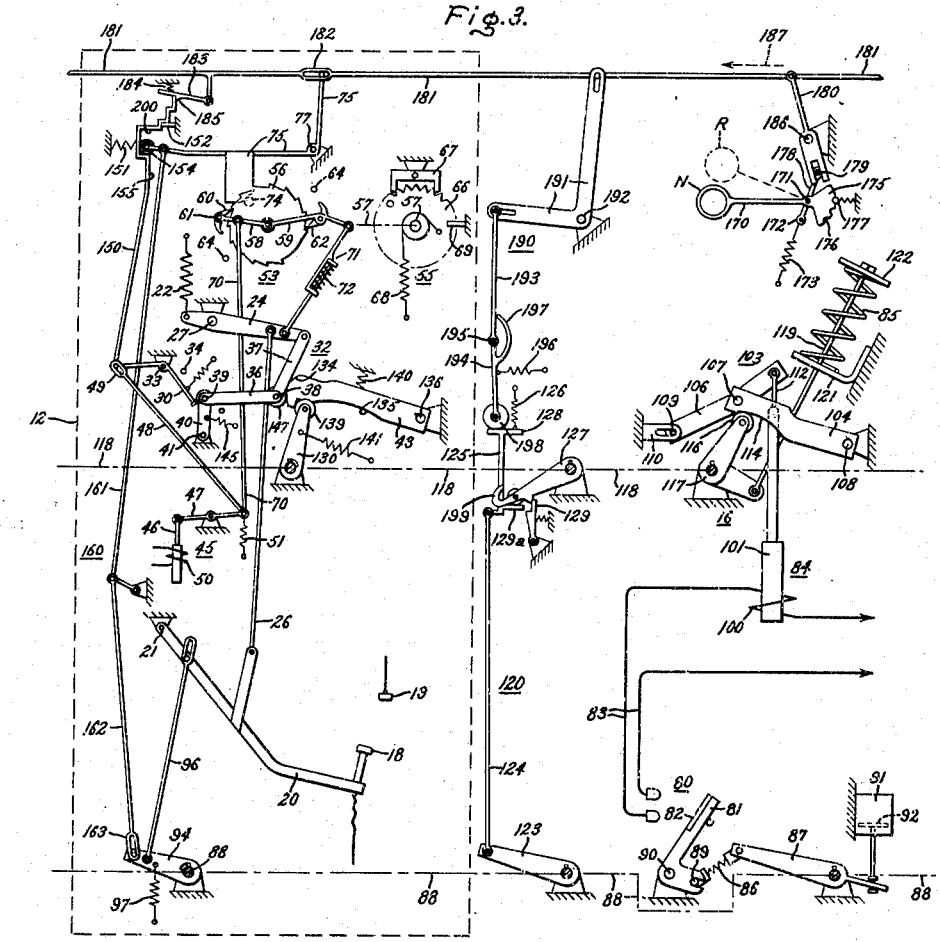
Figure 8:
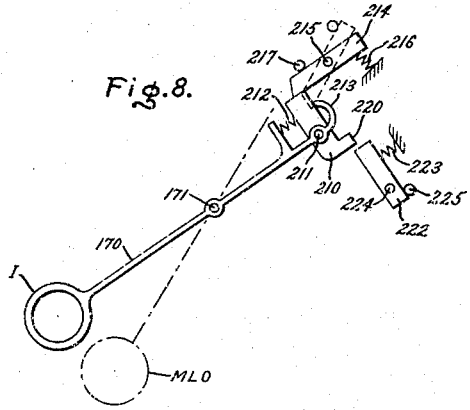
Figure 7:
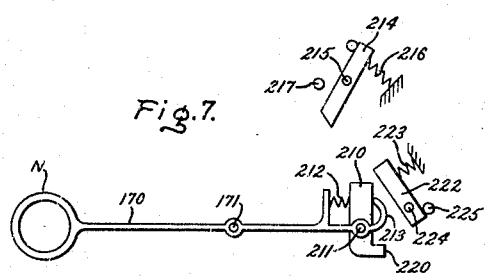

For a better understanding of my invention reference may be had to the following description taken in connection with the accompanying drawings, wherein FIG. 1 is a schematic illustration of a multiple pole-unit circuit breaker embodying my invention. One of the pole-units is shown in closed position, whereas another of the pole-units is shown in an instantaneous position through which it passes shortly after having been tripped to open. FIG. 2 is a schematic view of a portion of FIG. 1 illustrating the manner in which the tripped pole unit of FIG. 1 is reclosed. FIG. 3 is another schematic view illustrating one of the pole-units after having been automatically locked-out. FIG. 4 is a wiring diagram illustrating the electrical relationship between major components of my circuit breaker. FIG. 5 illustrates a structural detail common to each of the pole units. FIG. 6 illustrates another structural detail common to each of the pole units. FIGS. 7 and 8 illustrate a modified form of handle which can be used for manually controlling the breaker.

Referring now to the drawings, the circuit breaker shown in FIG. 1 is of the polyphase type comprising three pole-units 10, 12 and 14, one for each phase of a three-phase power circuit. As will soon appear more clearly, these pole-units are capable of operating independently of each other but rely for reclosing upon motive means 16 common to all of the pole units. Since each of these pole-units is essentially identical in structure, I have shown one of the units 14 in block form in order to avoid unnecessary duplication. Of the remaining pole units, the unit 10 is shown in a closed-circuit position, whereas the unit 12 is shown in a position through which it passes shortly after having been tripped to open.

To facilitate an understanding of the invention, corresponding parts in the pole units 10 and 12 have been assigned corresponding reference numerals. Thus, each of the pole units comprises a pair of separable contacts 18 and 19, one contact 18 being mounted for movement relative to the other contact 19 by means of a movable switch blade 20 pivotally-supported at 21. The movable contact 18 is biased toward an open-circuit position by means of a suitable opening spring 22, which is a tension spring acting through a crank arm 24 and an elongated operating rod 26 pivotally interconnecting the crank arm and the switch blade 20. The crank arm 24 is pivotally mounted on a fixed fulcrum 27.

In the pole unit 10 of FIG. 1, the contacts 18, 19 are shown latched in closed position by means of a prop-type trip latch 30 which restrains a collapsible trip-free linkage 32 connected to the switch blade 20 through the crank arm 24 and the operating rod 26. This trip latch 30 is pivotally supported on a fixed pivot 33 and is suitably biased toward a latched position against a stop 34. The trip-free linkage 32 comprises a pair of toggle links 36 and 37 joined together at a knee 38. One of the toggle links 37 is pivotally connected at its opposite end to the crank arm 24, whereas the other toggle link 36 is connected by a pivot pin 39 to the upper end of a guide link 40. This guide link 40 is pivotally supported at its lower end on a fixed fulcrum 41. The pivot pin 39 carries a latch roller 42 which cooperates with the previously-described trip latch 30. The toggle 36, 37 is prevented from collapsing at its knee 38 by means of an input cam member 43 which, during the time the pole unit is closed, is maintained in the position shown in FIG. 1 in a manner which will soon be described.

Opening operation

For tripping the latch 30 of pole unit 10 (FIG. 1) so as to permit the contacts 18, 19 to open under the influence of opening spring 22, I provide a tripping solenoid 45 having its armature 46 pivotally-connected to one end of a pivoted lever 47. The other end of the lever 47 is coupled to the trip latch 30 by means of a link 48 forming a lost-motion connection 49 at its upper end. For each individual pole unit, the operating coil 50 of the tripping solenoid 45 is connected in series-circuit relationship with its main contacts 18 and 19, as is evident from the wiring diagram of FIG. 4. When the operating coil 50 is sufficiently energized in response to predetermined electrical conditions, such as over-current, it produces a force which drives the armature 46 downwardly against the bias of a suitably-calibrated spring 51, forcing the lever 47 counterclockwise and the link 48 upwardly. After the lost motion in connection 49 has been taken up, continued upward movement of the link 48 rotates the trip latch 30 clockwise about pivot 33. This clockwise, or tripping movement, of the trip-latch 30 suddenly removes the prop effect from the trip-free linkage 32 and thus renders the linkage ineffective to continue transmitting closing force to the contacts 18, 19. As a result, the opening spring 22, acting through the crank arm 24, is then free to rapidly open the contacts and to collapse the linkage 32 into a position corresponding to that shown in pole unit 12 of FIG. 1.

In most circuit breaker applications of this type, it is desirable to perform this first opening operation substantially instantaneously. If the fault condition which caused this opening operation has not cleared itself at the time the contacts are subsequently reclosed, it is desirable to again open the contacts. This second opening may be either instantaneous or time-delayed, depending upon the circuit application. In the disclosed embodiment, as will soon be apparent, I have chosen to delay this second opening operation, as well as any quickly successive additional ones, e.g., which might result from subsequent reclosures on a persistent fault.

Integrating and timing devices

For achieving this desired sequence of instantaneous and time-delayed opening operations, I have provided for each pole-unit an integrating or counting device 53 and a timing device 55. Although these devices 53 and 55 can assume any desired suitable form, either hydraulic or mechanical, I have chosen, for illustrative purposes, a ratchet-type of integrating device 53 and an escapement-controlled timer 55. These are of a conventional design and operate in essentially the same manner as corresponding integrating and timing devices described and claimed in U.S. Patent 2,633,514, McCurry et al., assigned to the assignee of the present invention.

In general, the integrating device 53 comprises a rotatable ratchet wheel 56 secured to a suitably journalled central shaft 57. Freely mounted on this shaft 57 are a pair of radially-extending arms 58 and 59. The arm 58 carries a trip-controlling pawl 60 which is biased in a clockwise direction about its pivot 61 by a suitable spring (not shown). Similarly, the other arm carries a pawl 62, hereinafter termed an advancing pawl, which is biased in a clockwise direction about its pivot 63 by a suitable spring (not shown). When the pole unit associated with a particular integrating device 53 is in closed position, e.g., as is the pole-unit 10 of FIG. 1, then the pawls 60 and 62 are held out of engagement with the periphery of the ratchet wheel 56 by means of suitable stops 64 cooperating with cam surfaces on the pawls. However, when the arms 58 and 59 are moved clockwise from the closed position shown in pole unit 10 (FIG. 1) the stops 64 become ineffective to hold the pawls out of engagement with the ratchet periphery and, as a result, their associated springs (not shown) force the pawls into engagement with the periphery. The periphery of the ratchet wheel 56 contains one smooth portion and another portion having ratchet teeth. When either of the arms 58 or 59 is driven clockwise with its pawl in engagement with the ratchet teeth, the ratchet wheel 56 will be advanced, whereas if the pawl is working on the smooth portion of the periphery no driving engagement or resultant advancement of the ratchet wheel will occur.

All rotation of the ratchet wheel 56 is retarded by the timer 53 which comprises an escape wheel 66 appropriately secured to the shaft 57 and cooperating in a conventional manner with an oscillatory mass escapement member 67. The interaction between the teeth of the escape wheel 66 and the projections of the oscillatory member 67 regulates the speed of rotation of the escape wheel in a well-known manner. The escape wheel 66, as well as the interconnected ratchet wheel 56, are biased toward the initial or normal position shown in pole unit 10 of FIG. 1 by means of a suitable tension spring 68 acting to rotate the escape wheel in a counterclockwise direction. Counterclockwise movement past this normal position is prevented by means of a suitable stop 69, cooperating with a projection on the escape wheel.

The integrating and timing devices 53 and 55 are interrelated to their corresponding pole unit by means of a first link 70, which is rigid, and a second link 71, which is resiliently expansible. The first link 70 pivotally interconnects the armature 46 of the tripping solenoid 45 and the arm 58 of the trip-controlling pawl 60. The second, or expansible link 71, pivotally interconnects the opening crank 24 and the arm 59 of the advancing pawl 62.

Referring to pole unit 10 of FIG. 1, when the armature 46 of the tripping solenoid is driven downwardly to initiate a tripping action, it drives the link 70 upwardly and the pawl-supporting arm 58 clockwise. This moves the pawl away from its stop 64 permitting it to engage the periphery of ratchet wheel 56 under the bias of its spring (not shown). If the pawl engages a smooth portion of the ratchet wheel, as would be the case for the first tripping action, then the integrating and timing devices 53 and 55 will offer essentially no resistance to upward movement of link 70. As a result, the tripping armature 46 is free to move downwardly without significant retardation, thereby to effect a substantially instantaneous tripping of trip latch 30 through the movement of lever 47 and link 48. The position which the above-described trip-controlling parts will occupy, shortly after this tripping action has occurred, will correspond to that illustrated in the pole unit 12 of FIG. 1.

Referring again to pole unit 10 of FIG. 1, upon tripping, the opening spring 22 drives the crank 24 clockwise about its pivot 27 thereby opening the main contacts 18, 19, as previously described, and also driving the expansible link 71 downwardly, thereby driving the pawl-supporting arm 59 clockwise and causing the advancing pawl 62 to advance the ratchet wheel 56 through a first increment of travel, the speed of travel being regulated by timer 55. Because of the expansible character of the link 71, the opening speed of the main contacts is not significantly retarded by the slow-moving timing device 55. Opening action simply compresses the break-away spring 72 within link 71, after which the spring more slowly expands to drive the pawl 62 and the ratchet wheel 56 through the above-described first increment of travel. The break-away spring 72 is so light that it offers no significant resistance to the opening action. The position of the parts after such an opening action has occured and after the break-away spring 72 has partially expanded to drive the ratchet wheel through a portion of its first increment would correspond to that shown in pole unit 12 of FIG. 1.

At the instant illustrated by the pole unit 12 of FIG. 1, the armature 46 will have become deenergized and, together with the opening pawl arm 58, will have reset back somewhat to the extent permitted by the slot 49 of the link 48. The latch 30, at the illustrated instant, is blocked from resetting due to the left-wise position assumed at this time by the guide link 40 and roller 42. This blocking action and its purpose will be described in greater detail hereinafter.

After this first opening action, the pole unit will be automatically reclosed in a manner soon to be described and the parts of the pole unit will then occupy the same position as shown in pole unit 10, FIG. 1, with the exception of the integrating and timing devices 53 and 55. As for these devices, the ratchet wheel 56 and the escape wheel 66 will have been advanced through their above-described first increment. If the fault which had caused the first tripping had cleared itself, then upon reclosing, the resetting spring 68 would slowly return the ratchet wheel and the escape wheel back to their initial position, the rate of travel being controlled by the oscillatory escapement member 67. The stops 64 once again hold the pawls out of engagement with the periphery of the ratchet wheel and therefore prevent the pawls from interfering with this resetting action.

In the event, however, that the fault has not cleared at the time the pole unit is reclosed, then the tripping solenoid 45 will again drive the trip-controlling pawl 60 upwardly. This time, however, the pawl 60 will engage a ratchet tooth which had been advanced into its path by the advancing pawl 62 during the previous opening operation. As a result, this upward movement of the pawl 60 will be retarded by the timer.

This, of course, retards the movement of the tripping solenoid armature 46 and delays tripping until the retarded armature can move the link 48 upwardly to take up the lost motion at 49 and to thereafter trip the latch 30. Opening results in the same manner as previously described with the advancing pawl 62 again advancing the ratchet wheel in the same manner. In this second operation and in subsequent operations, both pawls 60 and 62 contribute increments of advance to the counting device 53.

If upon reclosure following this opening, the fault has not cleared, then the same time-delayed opening operation will occur, resulting in further advancement of the ratchet wheel 56. Automatic reclosing will again occur and if the fault persists, opening and reclosing will continue until the ratchet wheel 56 has been advanced into a position wherein an actuating pin 74 carried thereby engages and lifts a lock-out controlling lever 75. Lifting of this controlling lever 75 will produce automatic lock-out of the pole-unit, as will soon be described, thereby preventing further automatic reclosures of the pole unit.

It should be apparent from the description as thus far set forth that the integrating device 53 will cause automatic lock-out only in response to a predetermined number of opening operations occurring in rapid succession, which is indicative of a persistent or permanent fault. If the fault is a temporary one which is cleared prior to the time at which lock-out would otherwise occur, then, with resumption of the normally-closed condition, the resetting spring 68 will slowly return the ratchet escape wheels 56 and 66 to their initial position. As a result, if another fault should occur thereafter, another complete series of opening and reclosing operations is then possible.

*Automatic reclosing operation*

The automatic reclosing operations referred to hereinabove are initiated in response to an opening operation by means of a control switch 80, which is common to all of the pole-units. This control switch 80 comprises a pivoted switch member 81 carrying a bridging contact 82 which, upon closure, is adapted to complete an energizing circuit 83 for a spring-charging solenoid 84. As will appear in greater detail hereinafter, this solenoid 84 acts to charge and subsequently effect discharge of a stored-energy closing device 85 which, upon discharge, operates to close the then-open pole-unit or units, as the case may be.

This closing control switch 80 is a quick-acting switch comprising an overcenter compression spring 86 and an actuating crank 87 keyed to a rotatable actuating shaft 88. At one of its ends, the overcenter spring 86 is pivotally coupled to the switch member 81 through trunnions 89 and, at its other end, is suitably pivotally-connected to the outer end of the actuating crank 87. Normally, the crank 87 occupies a position slightly above that shown in FIG. 1 (for example, see FIG. 2). With the crank 87 in this normal position, the overcenter spring 86 biases the switch open since its line of action passes below the fulcrum 90 of the switch member 82. However, when the crank 87 is driven counter clockwise through the solid line position of FIG. 1 and into the dotted line position of FIG. 1, the line of action of the then-compressed overcenter spring passes above the fulcrum 90. When this occurs, the spring drives the switch member 81 toward closed-position with a snap action. For introducing a time delay into this closing action, I have provided a small fluid dashpot 91 having a piston 92 suitably coupled to the actuating crank 87. This dashpot is designed in a well-known manner to retard switch-closing movement of the actuating crank 87 but to offer substantially no impedance to return, or switch-opening, movement of the actuating crank 87. It is to be understood that this retardation of actuating crank 87 in no way affects the ability of the overcenter spring 86 to produce a snap-action irrespective of the speed of the actuating crank.

For closing the control switch 80 in response to opening of any pole unit, each of the pole units is provided with a driving crank 94 mounted on the shaft 88 by means of a lost-motion driving connection such as the loose keyway 95. This driving connection 95 is best seen in FIG. 5, which shows in detail the driving crank of one of the pole-units in the position it would occupy when that pole unit is closed. So long as the pole unit is closed, the driving crank is held in an elevated position by means of a tie-link 96 pivotally interconnecting the main switch blade 20 and the crank 94. This tie-link 96 has a lost-motion connection at its upper end with the switch blade 20 so that the switch blade may move downwardly to open its contacts without impedance from the tie-link and associated mechanism. Thus, when the switch blade 20 is driven downwardly to open the pole-unit, as in unit 12 of FIG. 1, the driving crank 94 is freed from the switch blade 20 and is driven in a follow-up counter-clockwise direction independently by means of a spring 97 individual to each crank 94. This immediately begins to rotate the common actuating shaft 88 and the switch actuating crank 87 in a counter clockwise direction at a rate controlled by the dashpot 91. In the pole unit 12 of FIG. 1, as indicated by the solid lines, this counter-clockwise rotation under the influence of spring 97 has progressed through a portion of its ultimate extent. When the crank 87 has continued its movement sufficiently to shift the spring 86 overcenter, the spring responds by quickly driving the switch member 82 into its dotted-line closed position, as previously explained. This counter-clockwise rotation of the actuating shaft 88 has had no effect on the driving cranks 94 of the still closed pole-units because it has merely taken up the lost motion provided in the loose keyways 95 of these other driving cranks. For example, note the connection 95 of pole unit 10 of FIG. 1.

The energizing circuit 83, which is established by the above-described closing of switch 80 in response to opening of a pole unit, supplies power to the coil 100 of the solenoid 84. The coil 100 responds by pulling the solenoid armature 101 rapidly downwardly. This downward movement of armature 101 is transmitted to the energy-storing spring device 85 by means of a force-multiplying mechanism 103. This force-multiplying mechanism 103 comprises a pair of toggle levers 104 and 106 pivotally interconnected by a knee joint 107. The outer end of toggle lever 104 is pivotally mounted on a stationary fulcrum 108, whereas the outer end of toggle lever 106 is pivotally mounted on a shiftable pivot pin 109, which is guided for horizontal sliding movement by means of a slotted support 110. This arrangement provides a substantially straight line linkage for the solenoid armature 101 which is coupled to the inner end of toggle lever 106 by means of a suitable connecting rod 112. The other toggle link 104 has a cam surface 114 which is arranged to cooperate with a roller 116 mounted on one arm of a bell crank 117. This bell crank 117 is keyed to a main operating shaft 118 which is capable of transmitting closing power to any or all of the pole units in a manner which will soon be described. The other arm of the bell-crank 117 is pivotally-connected at its outer end to a spring-operating rod 119. This operating rod 119 extends through an opening in a fixed bracket 121 and, at its upper end, carries a suitable-attached abutment 122 which bears against the upper end of heavy compression spring 85. The lower end of the compression spring 85 is supported on the bracket 121.

Thus, it should be apparent that when the solenoid armature 101 is driven downwardly from its position of FIG. 1 into its position of FIG. 2, it will extend the toggle 104, 106, and, through the cam surface 114, will rotate the bell crank 117 clockwise into the position of FIG. 2. This counterclockwise rotation of bell-crank 117 pulls the operating rod 119 and the abutment 122 downward thereby compressing the spring 85 and driving the spring parts toward the position of FIG. 2.

It will be observed that as the toggle linkage 104, 106 moves downwardly, the effect is that the roller 166 is subject to the favorable increasing leverage of the link 104 while, at the same time, the arms of the bell crank are moving into favorable moment-increasing position. Thus, the increasing pull of the armature 101 is magnified so as to positively overcome the progressively increasing reaction of the heavy closing spring 85 in the process of being compressed through the mechanism 103.

When the spring 85 has been fully compressed, as is illustrated in FIG. 2, the solenoid 84 is deenergized, thereby removing all solenoid-derived restraining forces from the spring 85, thus, permitting the spring to discharge, or expand, and close the then-open pole unit or units, as will soon be described.

This deenergization of the solenoid at the end of a spring charging operation is accomplished by means of a switch cut-off linkage 120 which operates to open the solenoid control switch 80 only at the end of the solenoid stroke. This cut-off linkage 120 comprises a crank 123 which is keyed to the actuating shaft 88 for the control switch 80, a link 124 pivotally connected to the outer end of crank 123, and a U-shaped actuating bracket 125 pivotally connected to the upper end of the link 124. This actuating bracket 125 is suitably mounted for vertical reciprocation and has connected thereto a light tension spring 126 which counterbalances the weight of the cut-off linkage 120 and prevents the undesirable possibility that this weight will advance the control switch 80 toward closed position. The tension spring 126 normally holds the cut-off linkage 120 in a position slightly above the solid line position shown in FIG. 1 until one of the pole units is tripped open and its control-switch actuating spring 97 is released to drive the control-switch actuating shaft 88. When this occurs, the actuating spring 97, in driving shaft 88 counterclockwise to close the control switch 80, pulls the U-shaped bracket 125 downwardly against the balancing spring 126 by a force transmitted through the parts 123 and 124. The cut-off linkage 120, in so moving, passes through the solid line intermediate position of FIG. 1 and into the dotted line position of FIG. 1. During this latter portion of the movement, the control switch 80 is closed to energize the solenoid and charge the spring 85, as previously-described. Since the bell crank 117 through which spring-charging power is transmitted is keyed to the main operating shaft 118, it will be apparent that charging action will rotate this main shaft in a clockwise direction. This clockwise rotation of the shaft causes clockwise movement of a cut-off crank 127 keyed to the main shaft 118. In so moving, a roller overhung from the cut-off crank 127 engages the top arm 128 of the U-shaped bracket 125 thereby immediately lifting the lowered bracket to rotate the control switch actuating shaft 88 back in a clockwise, or opening direction. Opening of the control switch 80 is effected by this action of cut-off linkage 120 when the solenoid 84 has fully charged the main spring 85. The parts of the closing mechanism are then in the position illustrated in FIG. 2, where the control switch 80 is shown with its contacts in the act of opening.

It will be observed from FIG. 2, that a latch 129 is provided which cooperates with the lower arm 129a of the U-shaped bracket 125 and holds the bracket in its upper position until released. The purpose of this latch 129 is to maintain the solenoid control switch 80 positively in open position until the main spring 85 can discharge to perform its desired breaker-closing operation thereby effectively preventing the solenoid from being reenergized during such closing operation. Such reenergization would be most undesirable because it would cause the solenoid to oppose the then-discharging spring 85 thereby defeating or impairing the closing action of the spring. Thus, it will be apparent that any pole unit which might have tripped out during discharge of spring 85 should be inoperative to cause reclosing of the solenoid control switch 80 until the latch 129 has been released. This release of latch 129 is effected at the end of the spring discharging, or closing, action by the cut-off crank 127 returning to its normal position. This is best illustrated in FIGS. 1 and 3, where the parts are shown after the spring 85 has discharged and rotated the main shaft 118 counterclockwise to complete a closing operation. This counterclockwise rotation of shaft 118 has caused the cut-off crank 127 to release the latch 129, thus permitting the control switch 80 to be closed again, if such closing is then required.

The specific manner in which the above-described charging and discharging of the spring 85 is utilized to effect reclosing of any then-open pole unit will now be described.

Assume first that the pole unit 12 of FIG. 1 is the pole unit which has been tripped and which it is desired to reclose. As previously described, such tripping has caused the trip-free linkage 32 of the pole unit 12 to move into the collapsed position of FIG. 1 and has also caused closure of switch 80 and consequent energization of solenoid 84. The solenoid has responded by pulling its armature 101 downwardly to charge the main spring 85 and to effect clockwise rotation of the main shaft 118. FIG. 2 illustrates the position of the parts at the instant that the solenoid has completed its stroke and fully charged the spring 85. As seen in FIG. 2, that clockwise rotation of the main operating shaft 118 which resulted from the spring-charging operation has caused an actuating arm 130 coupled to the shaft 118 by means of a lost motion connection 131 also to move clockwise. This connection is shown in detail in FIG. 6. This actuating arm 130 cooperates with the input member 43, which has upper and lower cam surfaces 134 and 135, respectively. The input member 43, which is pivoted about a fixed pivot 136, was heretofore maintained in the elevated position shown in FIG. 1 by detent means comprising a concave recess 138 formed in the lower face of input member 43 and a cooperating roller 139 rotatably carried by the actuating arm 130. So long as the main operating shaft 118 was maintained in the position of FIG. 1, the roller 139 remained in the detent recess 138. However, when the operating shaft was rotated clockwise during charging, as above described, the restraint of the operating shaft 118 and the connected main spring 85 was removed. Although the detent means of the tripped pole unit 12 tends to frictionally restrain the actuating arm 130 from following clockwise rotation of the operating shaft 118, such restraint is insufficient to overcome the action of a pair of auxiliary resetting springs 140 and 141, which bias the members 130 and 43 toward the reset position of FIG. 2. As a result, when clockwise rotation of the operating shaft 118 has been completed, at which time the spring 85 is fully charged, the members 130 and 43 have been driven into the reset position of FIG. 2 by means of the resetting springs 140 and 141.

Prior to such resetting movement of members 130 and 43, the trip-free linkage 32 of the tripped pole-unit 12 had been prevented from resetting from its unlatched condition of FIG. 1 back into its latched condition of FIG. 2. This was the case because the input member 43, before being reset, was blocking a main resetting spring 145 of the linkage 32 from returning the guide link 40 and latch roller 42 into latched relationship with the trip latch 30. As may be seen, for example in pole unit 12 of FIG. 1, prior to its resetting, the input member 43 was in interfering relationship with a roller 147 at the knee 38 of the linkage 32. However, downward resetting movement of the input member 43 moves the input member out of this interfering relationship and frees the main resetting spring 145 to reset the linkage 32, i.e., to return the latch roller 42 into latched relationship with the trip latch 30. For reasons which will soon appear more clearly, such resetting action is permitted only at the very end of the spring-charging stroke of solenoid 84.

Thus, when the main spring 85 is fully charged, as shown in FIG. 2, the linkage 32 is reset to a latched condition and is thus capable of transmitting the about-to-be-released closing power to the movable contact 18.

This closing power is applied to the linkage 32 as soon as the solenoid switch 80 is opened at the end of the spring charging stroke, this instant being illustrated in FIG. 2. The spring 85 then being essentially free of restraint from solenoid-derived compressive forces, expands, and drives the common operating shaft 118 counterclockwise at high speed. This drives the actuating arm 130 counterclockwise from its momentary position of FIG. 2, and the action of roller 139 working on the cam surface 135 produces a wedging action which drives the input member 43 clockwise about its pivot 136. This clockwise motion of the input member 43 is transmitted through the upper cam surface 134 to the roller 147 of the linkage 32. It drives the roller 147 counterclockwise about pivot 39, thereby extending the main toggle 36, 37 and, thus, closing the contacts 18, 19 by means of closing thrust transmitted from the toggle to the contact 18 through the parts 24, 26, 20. When this closing operation has been completed, the linkage of the pole unit occupies a position such as illustrated by the pole unit 10 of FIG. 1.

With my arrangement it will be observed that as the spring 85 expands, i.e., as its closing force diminishes, the roller 139 acting along the cam surface 135 is moving into more favorable force multiplying relationship with respect to the input member 43 and the trip-free closing toggle 32. Thus, an effective sustained closing effort is directed to the movable contact as it approaches its latch-closed position while, at the same time, overcoming the increasing opposition of opening spring 22.

Providing that its trip latch 30 is not tripped, the linkage 32 of any of the pole units, after being reclosed as above-described, is held in a closed position corresponding to that of pole unit 10 of FIG. 1 even if one or more of the other pole units is subsequently tripped and reclosed. This is accomplished primarily by relying upon the detent means 138, 139 between the actuating arm 130 and the input member 43 and also upon the lost motion keyway connection 131 between the main shaft 118 and the actuating arm 130. For example, at the end of the above-described closing stroke, the roller 139 on the arm 130 moves into the detent recess 138 and the input member 43 then lies beneath the roller 147. The opening spring 22 when tensioned during the closing stroke produces forces which tend to collapse the toggle 36, 37 at the knee 38, but these forces when transmitted through the input member 43 to detent means 138, 139 create sufficient frictional resistance at the detent 138, 139 to prevent relative movement between the actuating arm 130 and the input member 43 after completion of the closing stroke. This, of course, maintains the input member 43 in its elevated position and thereby blocks the toggle 36, 37 from collapsing at its knee 38, thereby holding the linkage 32 in closed position. Even if some other pole unit trips out and the main operating shaft 118 is rotated clockwise as a result of solenoid operation thereafter, as previously describd, the detent means 138, 139 of the non-tripped unit will still hold its input member 43 in the upper, or hold-closed, position. This is the case because even when the main operating shaft 118 is rotated clockwise to create lost motion in connection 131 and to free the actuating arm 130 from the bias of main spring 85, there is still sufficient frictional resistance, or holding power, in the detent means 138, 139 to preclude relative movement between the actuating arm 130 and the input member 43. Accordingly, the input member 43 remains in its upper, or hold-closed, position during this interval. The lost motion connection 131, of course, permits the main operating shaft 118 to be rotated clockwise, as above-described, without dragging the actuating arm 130 therewith, thus permitting the actuating arm to remain in its hold-closed position under the restraining influence of detent means 138, 139.

As for any pole-unit which has been tripped at the time of this clockwise resetting motion of main-operating shaft 118, its opening spring 22 will be applying little or no force to the detent means 138, 139. Accordingly, there will be only slight frictional resistance in the detent means 38, 39 of such a pole unit. This slight resistance is insufficient to block the action of auxiliary resetting springs 140 and 141, and, as a result, upon clockwise rotation of the main operating shaft 118, these auxiliary resetting springs drive the actuating arm 130 and the input member 43 into the reset position shown in FIG. 2, as previously described. In this reset position the members 130 and 43 are capable of responding to discharge of the main spring 85 to close their associated then-tripped pole-unit.

It should be apparent from this description of a selective resetting operation that the detent means 138, 139 operates to maintain any non-tripped pole unit in its closed position at all times until the latch 30 of that particular pole unit is tripped. This permits tripping and subsequent reclosure of any of the other pole units without disturbing the non-tripped unit. It should also be apparent that the detent means 138, 139 is a structurally simple arrangement which avoids the necessity for the usual hold-closed prop.

One of the objects of my invention is to provide an automatic reclosing circuit breaker which requires for reclosing no source of electrical energy other than the main power circuit in which the breaker is connected, whereby to eliminate the need for separate sources of control power, such as batteries and the like. As may be seen in FIG. 4, this is accomplished in the disclosed circuit breaker by utilizing the normally-open control switch 80 for connecting the solenoid across two phases of the power circuit on the line side of the breaker contacts 18, 19. One particular advantage of such an arrangement is that because the control switch 80 is normally-open and is closed for only a very short interval, the solenoid is subjected to current for only a very short interval. If such an across-the-line, or potential, solenoid is used for directly reclosing the breaker, as is conventional, then there is the danger that the solenoid will lose its closing power at the end of a closing stroke when a fault is present on the line. If such a fault is present when the breaker contacts are driven toward closed position, fault current will flow between the contacts before the breaker is latched closed. In many cases, this will produce such a drop in voltage across the terminals of the solenoid coil that the solenoid will be harmfully deprived of power at the instant power is most needed. My circuit breaker construction permits me to overcome this disadvantage of an across-the-line solenoid and yet retain its advantages. This is the case because I do not utilize the across-the-line solenoid 84 for direct reclosing but rather use it to charge a spring 85, which is capable of subsequently delivering its stored energy to the breaker independently of electrical conditions in the power line, i.e., the spring will not be deprived of power by reason of a fault on the line at the time of closing.

Another feature of my invention is that spring-discharge is effected without the need for the usual latches or overcenter arrangements. Simply by deenergizing the charging solenoid 84 at the appropriate instant, the spring 85, which is a simple stationarily-located compression spring, is caused to discharge and close the breaker, as described hereinabove. Even if the solenoid 84, during charging, should become prematurely deenergized, as by accidental loss of control power, there is no danger that resultant discharge of the spring 85 will cause the breaker contact 18 to be moved toward closed position without sufficient power to complete the closing operation. This is the case because in my circuit breaker the trip-free closing linkage 32 is maintained in a collapsed position at all times during which the stored energy level of the main spring 85 is below that required to complete a fully-rated closing operation. As a result, during this time, the linkage 32 is incapable of transmitting closing power to the movable contact 18. In accordance with my invention, I reset this linkage 32 into a thrust-transmitting condition only when the stored energy level in the spring has ben increased to at least that required to complete a fully-rated closing operation. This should be apparent from the previously-set forth description of a mechanism-resetting operation where it was specified that resetting of the linkage 32 occurred only at or near the end of a spring-charging operation. FIG. 2 shows the linkage 32 and the closing motive means 16 at an instant shortly after this resetting of linkage 32 has occurred.

*Automatic lock-out*

If the fault which initiated opening of a particular pole-unit is still present when the pole-unit is reclosed as above-described, then automatic opening and reclosing operations will continue in rapid sequence until either the fault is cleared or until the integrating device 53 for the pole unit has been advanced to lock-out position in response to the opening operations. As explained in connection with the integrating and timing devices 53 and 55, any desired one or series of these opening operations can be caused to take place either instantaneously or with time delay depending upon the preselected peripheral configuration of the ratchet wheel 56. At any rate, if the fault is a permanent one, i.e., one which is not cleared by this quickly successive series of opening and reclosing operations, then the ratchet wheel 56 becomes incrementally advanced to a lock-out position wherein its actuating pin 74, as seen in FIG. 3, engages and lifts the lock-out controlling lever 75, which is an L-shaped member pivoted at 77. For effecting lock-out of the pole-unit in response to this lifting of the controlling lever 75, I provide a hook-shaped lock-out link 150 which is pivotally coupled to the trip latch 30 and which is biased to the right by a suitable spring 151. Each time the tripping solenoid 45 drives the link 48 upwardly to cause tripping of latch 30, it also drives the lock-out link 150 upwardly. If the lock-out link 150, in its elevated position, is not hooked on a fixed projection, or abutment, 152, as in FIG. 3, then the trip latch 30 will be free to reset in its usual manner, i.e., at the end of a spring charging operation, and the link 150 will return to its lower or normal position coincident with such resetting. After all of those opening operations prior to lock-out, the link 150 is free to return from its elevated position without interference from the projection 152, because it is maintained out of engagement with the projection by means of a guide roller 154 mounted at the end of the controlling lever 75. This is perhaps best seen in the pole unit 12 of FIG. 1, wherein the guide roller 154 is shown engaging an inwardly projecting surface 155 on the elevated lock-out link 150 and so maintaining the link offset from, and out of engagement with, the projection 152. The guide roller 154 functions in this same manner for all opening operations prior to advancement of the ratchet wheel 56 to its lock-out position. However, when such advancement to lock-out does occur, the controlling lever 75 is lifted by pin 74 as previously described, and the guide roller 154 then becomes positioned in registry with a recess 156 formed in the lock-out link 150. When the guide roller 154 is so positioned, as shown in FIG. 3, it is no longer effective to prevent the lock-out link 150 from becoming hooked on projection 152 when elevated. As a result, when the lock-out link 150 is then elevated by a tripping operation, the spring 151 shifts the link 150 to the right and causes it to become hooked in its elevated position on the projection, or abutment, 152. As seen in FIG. 3, such hooking action holds the trip latch 30 in its tripped position and prevents it from subsequently resetting into a latched position. This, of course, renders the associated trip-free linkage 32 incapable of resetting and consequently incapable of transmitting closing power to its movable contact 18. Thus, the contacts of the pole unit will be maintained in open-position, or locked-out, so long as the lock-out link 150 is hooked in its elevated position on the projection 152, as shown in FIG. 3.

Normally, in response to each opening operation of a pole unit, the control switch 80 will be closed to produce operation of the reclosing motive means 16. However, after an opening operation which results in lock-out of a particular pole unit, no further automatic reclosures of that pole unit are desired. Accordingly, the reclosing motive means 16 should not operate in response to opening operations which result in such lockout. Such undesirable further operations of the motive means 16 are effectively prevented in accordance with my invention by means of an anti-pump linkage 160 which, for each pole-unit, interconnects the lock-out controlling lever 75 and the driving crank 94 for the control switch 80. This linkage 160 comprises an upper link 161 pivotally connected to the lock-out controlling lever 75 and a lower link 162 pivotally interconnecting the upper link 161 and the driving crank 94. The connection 163 between the lower link 162 and the driving crank is of the lost-motion type, so as to permit the driving crank 94 to operate free from interference with the linkage 160 prior to lock-out. However, when the lock-out controlling lever 75 is lifted into its locked-out position, it lifts the link 162, taking up the lost motion in connection 163, thereby holding the driving crank 94 in its upper position shown in FIG. 3. Consequently, the driving spring 97 is prevented from rotating the actuating shaft 88 to close the control switch 80 in response to an opening operation which results in lock-out. Thus, it should be apparent that the linkage 160, upon operation of lock-out means 75, renders the control switch 80 unresponsive to opening of the locked-out pole unit. It should also be apparent that the linkage 160, in so affecting the control switch 80, prevents undesirable pumping action, i.e., repeated unsuccessful attempts by the motive means 16 to close a pole unit which is prevented from closing by its latch 30 being held in tripped position, as is the case after lock-out of the pole unit.

Another feature of my invention which should now be apparent is that any one of the pole units can automatically open, reclose, and even lock-out in response to a circuit abnormality without disturbing the remaining pole-units. Thus, if the phase conductors controlled by these remaining pole units are unaffected by the circuit abnormality, then service may be continued thereover. Lock-out of any one of the pole units does not disable the reclosing motive means 16, but permits this motive means to continue operative so that it is available to control the remaining non-locked-out pole-units, if called upon to do so. For example, when one of the pole units locks-out, as is shown in FIG. 3, its trip-free linkage 32 is maintained in a collapsed condition and is prevented from resetting whereby to prevent closing of this particular pole unit, but the reclosing motive means 16 continues operative to control the other non-locked-out pole units. Any of these non-locked-out units is free to open in response to a fault and to cause closure of the solenoid control switch 80. In the same manner as previously explained, closure of switch 80 causes the solenoid 84 to charge the spring 85 and to reset the linkage 32 of any open but non-locked-out pole unit. The spring 85 is subsequently discharged to close this reset pole unit. This may be followed by repeated opening and reclosure and eventual lock-out of this latter pole unit, all in the same manner as previously described, if such operations are necessary to clear the fault.

It may be observed that, when one pole unit is locked-out as in FIG. 3, subsequent reclosures of non-locked-out pole units will result in the up and down oscillation of the input member 43 in accordance with corresponding movement of the closing shaft 118. This, however, will exercise no closing effort on the locked-out linkage 32, which will merely move somewhat to the left and right as the cam surface 134 sweeps up and down past the toggle knee roller 147.

*Manually-initiated reclosing after lock-out*

For reclosing any of the pole-units which have been locked-out, I provide a manually-operable handle 170, which normally occupies the solid line position N shown in FIG. 3. This handle 170 is secured to a suitably journaled shaft 171 and comprises a downwardly extending crank portion 172. A tension spring 173 disposed in dead center relationship with respect to the crank portion 172 and the shaft 171 tends to maintain the handle 170 in its normal position of FIG. 3. Keyed to the shaft 171 is a quadrant 175 having a series of detent notches 176 on its periphery. These detent notches cooperate in a conventional manner with a spring-pressed ball detent 177 which tends to maintain the handle in certain preselected angular positions into which it can be pivoted, as will soon appear more clearly. Also keyed to the shaft 171 is an upwardly-extending operating arm 178 which at its upper end carries a pin 179 cooperating with a centrally-pivoted beam 180. The pin 179 is freely received in a suitable slot provided in the lower end of beam 180. At its upper end the beam 180 is pivotally joined to a cross-bar 181 which extends between all three of the pole units 10, 12, and 14. This cross-bar 181 has three slotted portions 182, each cooperating with a different one of the lock-out controlling levers 75 for the various pole units. Adjacent each of the hook-shaped lock-out links 150, the cross-bar 181 carries a pivoted restoring arm 183 which is biased downwardly by a suitable spring 184. This restoring arm 183 has a lug 185 which is arranged to engage the upper end of the lock-out link 150 when moved to the left from the position shown in FIG. 3.

This manual reclosing mechanism 170–185 recloses any of the locked-out pole units as follows. Referring to FIG. 3, when the handle 170 is pivoted clockwise from its normal position N into its dotted-line closed, or reset, position R, it drives the arm 178 clockwise, thereby pivoting the beam 180 counterclockwise on its central shaft 186, thereby forcing the cross-bar 181 in the direction of the dotted arrow 187. This bodily moves the restoring arm 183 to the left, causing its lug 185 to push the lock-out link 150 off the projection 152, thereby freeing the link 150 to move downwardly so as to permit resetting of trip latch 30.

For resetting the trip-latch 30 to permit completion of this manually initiated reclosing operation, there is provided a manually-controlled actuating mechanism 190 for the solenoid control switch 80. This mechanism 190, in response to the above-described resetting movement of the handle 170, operates to close the control switch 80, thereby causing the solenoid 84 to charge the spring 85 and, as previously-described, coincidentally to reset the linkage 32 including the trip latch 30. Such resetting of the trip latch 30 is possible at this time because the lock-out link 150, which is coupled to the trip latch 30, is then free from its projection 152, as described in the preceding paragraph.

This manually-controlled actuating mechanism 190 for the control switch 80 comprises a bell-crank 191 which is pivotally mounted on a fixed fulcrum 192 and has an upper arm suitably pivotally coupled to the cross-bar 181. The other arm of the bell crank 191 is pivotally connected to a push rod 193 suitably guided for vertical reciprocation. This push rod 193 at its lower end carries a thrusting link 194, which is pivotally joined thereto at 195. A suitable tension spring 196 urges the thrusting link 194 slightly beyond dead center with respect to the push rod 193 where it is restrained by a suitable extension 197 forming a stop which abuts against the push rod. The thrusting link 194 carries a roller 198 at its lower end which is arranged to engage the top of the U-shaped cut-off bracket 125.

Referring to FIG. 3, when the bell crank 191 is pivoted counterclockwise about fulcrum 192 in response to resetting movement of handle 170, it drives the roller 198 downwardly by force transmitted through the push rods 193 and 194. This forces the U-shaped bracket 125 downwardly thereby rotating the actuating crank 123 counterclockwise to close the control switch 80. This energizes the solenoid 84 which responds by rotating the main operating shaft 118 clockwise at it charges the main spring 85. Such clockwise rotation of the main shaft 118 causes the linkage 32 of the pole unit to reset, as previously described, since the latch 30 is now free to reset, and also lifts the cut-off bracket 125 by means of cut-off crank 127, as previously described. The cut-off bracket operates to open switch 80, thereby causing the spring 85 to discharge and close the then-reset pole unit in same manner as set forth hereinabove. Thus, a manually-initiated reclosing after lock-out has been completed.

This entirely manually-initiated closing operation will take place in the above-described manner even if the handle 170 is held in its reset position during or after the operation. This is the case because the thrust toggle mechanism 190 is collapsed at the end of its downward stroke by means of a cam-like extension 199 formed at the outer end of the cut-off crank 127. For example, as the roller 198 is completing its downward stroke, it encounters the extension 199, which cams the roller 198 to the left so as to break the knuckle of the thrust toggle 193, 194 thereby rendering the thrust toggle ineffective as a holding means for the cut-off bracket 124. The cut-off bracket is then free to move upwardly in response to a spring charging operation even though the lineman continues to maintain the handle 170 in its reset position. Thus, the control switch 80 is, in effect, trip-free of the manually-operable mechanism 190.

The lineman is unable to initiate additional manual closures of control switch 80 until after he returns the handle 170 to its normal solid-line position so as to permit the toggle parts 193, 194 to reset into their extended thrust-transmitting position shown in FIG. 3. Thus, the control switch 80, in addition to being trip-free of the linkage 190, is also non-pumping. There being no detent in the quadrant 175 for maintaining the handle 170 in the "reset" position R, it follows that the handle will drop back to its "normal" position N under the influence of the return spring 173 coincident with the lineman's removal of his hook-stick from the handle.

*Manual tripping and lock-out*

If any or all of the pole-units are in a non-locked-out or a closed condition and a lineman desires to manually trip the breaker to lock-out these units, he can do so by pivoting the handle 170 counterclockwise from its normal position through an intermediate position I (which will be discussed later) and into a final position, hereinafter termed the manual lock-out position MLO. Even after he releases the handle, it is maintained in this latter position MLO against the bias of spring 173 by the frictional action of ball detent 177 cooperating with the lowermost of the detent notches 176. Referring to FIG. 1, movement of the handle into this manual lock-out position MLO drives the cross-bar 181 to the right, thereby pivoting the lock-out controlling lever 75 of each pole unit clockwise about its pivot 77. This drives the roller 154 at the end of the lever 75 upwardly against the surface 200 of the lock-out link 150 thereby lifting the lock-out link and causing it to become hooked in an elevated position on the projection 152. Such lifting of the lock-out link 150 and hooking it upon the projection 156 trips the trip latch 30 to produce an opening operation of the associated pole unit and also maintains the latch in its tripped position to insure against reclosure. Energization of the solenoid 84 in response to such opening action is effectively prevented by means of the anti-pump linkages 160. These linkages 160, in response to the above-described clockwise pivoting of lock-out controlling levers 75, move generally upwardly to hold the driving cranks 94 for the solenoid control switch 80 in their upper position shown in FIG. 3 against the downward pull of the crank springs 97 which have been freed by the opened switch blades 20.

The breaker will remain lock-out until the handle 170 is moved out of this manual lock-out position MLO and is returned past the normal position N to the previously-descibed reset position R, after which, as previously explained, the handle 170 naturally falls back under its spring bias to its normal position N when the lineman removes his hook stick.

*Causing lock-out on the first automatic opening operation*

If a lineman is required to work on an energized power line controlled by an automatic reclosing circuit breaker, it is most desirable, for safety reasons, that he be able to preadjust the breaker in such a manner that it will lock-out on the first automatic opening operation. In the circuit breaker of my invention such preadjustment can be readily carried out by a simple operation of the lock-out handle 170. No additional handles or interconnecting linkages are required.

For example, referring to FIG. 1, assume that the handle 170 is in the normal, solid-line position shown and that the lineman wishes to produce lock-out of any one of the pole-units on its first automatic opening operation. He can do so simply by pivoting the handle 170 counterclockwise into an intermediate position I, where it is frictionally maintained by the action of ball detent 177 cooperating with the intermediate one of the detent notches 176. The restraining action of the ball detent 177 is sufficient to maintain the handle in this intermediate position against the bias of return spring 173 even after the lineman releases the handle 170. Movement of the handle into the intermediate position I drives the cross-bar 181 to the right, thereby producing clockwise movement of each lock-out controlling lever 75. The extent of this clockwise movement is considerably less than was the case with the previously-described manual lock-out operation and is sufficient merely to carry the roller 154 into registry with recess 156 of the lock-out link 150. As a result, when the first automatic opening operation of any one of the pole units occurs, the lock-out link 150 is free to move to the right and so becomes hooked in its elevated position on the projection 152 thereby preventing resetting of trip latch 30 and, as a result, preventing reclosure of the pole unit.

The above-mentioned clockwise movement of the lockout controlling levers 75 also moved the anti-pump linkages 160 generally upwardly thereby preventing closure of the control switch 80 in response to any automatic opening operation.

Because there is a possibility that a careless lineman, desiring to preset the breaker for one operation to lockout, might inadvertently pull the handle past the intermediate position I to the MLO position and thus produce an undesired tripping action, it is desirable to provide an especially effective detent means for this intermediate position I.

Such detent means is illustrated in FIG. 7 where I have shown a modified handle arrangement which, aside from the detent means, corresponds to the handle of FIG. 1. Referring now to FIG. 7, the handle 170 carries at its inner end detent means comprising a pivoted latch 210 which is biased in a clockwise direction about its pivot 211 by a spring 212. A suitable stop 213 carried by the handle limits this clockwise motion of the latch 210 to the position shown in FIG. 7.

Positioned above the handle 170 is a pivoted interference catch 214 which normally is biased about its pivot 215 into the position of FIG. 7 by a compression spring 216. Also positioned above the handle of FIG. 7 is a pivoted bypass catch 222 which is suitably biased counterclockwise about its pivot 224 into engagement with a stop 225 by means of a spring 223. When the handle 170 is pivoted counterclockwise toward the intermediate position I, the latch 210 brushes aside the bypass catch 222, after which the upper end of latch 210 encounters the pivoted interference catch 214 and rotates this catch clockwise about its pivot 215 until the catch engages a stop 217. The position of the parts when such engagement occurs is shown in FIG. 8. When such engagement occurs, the handle 170 occupies the intermediate position I and is temporarily blocked from further counterclockwise movement. Thus, the lineman not only receives a positive indication that the handle 170 is in its intermediate position but also is positively prevented from carelessly pulling the handle through this intermediate position I. The handle is prevented from returning to its normal position when the operator removes his hook stick therefrom by means of the bypass catch 222 which has fallen in behind the latch 210.

In order for the lineman to move the handle 170 beyond the intermediate position into the manual lockout position MLO, it is necessary that he back the handle 170 a short distance away from the intermediate position before proceeding further. As will be evident from FIG. 8, such reverse movement of the handle causes a tail piece 220 formed on the latch 210 to engage the upper end of the bypass catch 222. This rotates the latch 210 counterclockwise about its pivot 211 and out of interfering relationship with the interference catch 214. The interference catch 214 responds by moving into its dotted line position under the bias of its spring 216. The lineman is then free to resume counterclockwise rotation of the handle toward the manual lock-out position MLO. If the lineman desires subsequently to return the handle back to the normal position, such reverse movement is not significantly impeded by the bypass catch 222 since he can supply sufficient force to the handle to cause the latch 210 to brush aside the bypass catch during such reverse movement.

Preferably, the above-described multiple pole-unit breaker is mounted within a single oil-filled tank with only the handle 170 and its closely-associated structure mounted exterior to the tank. This provides a compact, weatherproof unit which is readily adapted to be mounted on a power-line pole, where it will provide reliable switching service without the need for any auxiliary source of control power.

Although I have described a preferred embodiment of my invention, it will be apparent to those skilled in the art that numerous changes and modifications can be made without departing from the spirit and scope of my invention. For example, certain features of my lock-out means and of my reclosing mechanism can be equally well used in single-phase automatic reclosing circuit breakers or in polyphase breakers wherein all of the pole units are coupled together for simultaneous operation or for simultaneous lock-out. I, therefore, intend in the appended claims to cover all such changes and modifications as fall within the true spirit and scope of my invention.

What I claim as my invention is:

1. In an automatic reclosing circuit breaker comprising a plurality of pole units each comprising separable contacts biased toward open position, each pole-unit further comprising a trip-free linkage for transmitting closing thrust to its contacts and a trip latch movable to a tripped position to render said linkage incapable of transmitting said closing thrust, common motive means operable to apply closing thrust to any one of said linkages, reclosing control means for producing operation of said motive means in response to opening of any one of said pole units, normally-inoperative lock-out means individual to each of said pole units and effective when operative to hold the latch of its corresponding pole unit in a tripped position and to render said reclosing control means unresponsive to opening of said corresponding pole unit, and integrating means individual to each of said pole units for rendering operative the lock-out means of its particular pole unit in response to a predetermined series of quickly successive operations of said particular pole unit.

2. In an automatic reclosing circuit breaker comprising a plurality of pole units each comprising separable contacts biased toward open position, each pole-unit further comprising a trip-free linkage for transmitting closing thrust to its contacts and a trip latch movable to a tripped position to render said linkage incapable of transmitting said closing thrust, common motive means operable to apply closing thrust to any one of said linkages, reclosing control means for producing operation of said motive means in response to opening of any one of said pole units, normally-inoperative lock-out means individual to each of said pole units and effective when operative to hold the latch of its corresponding pole unit in a tripped position, and integrating means individual to each of said pole units for rendering operative the lock-out means of its particular pole unit in response to a predetermined series of quickly successive operations of said particular pole unit.

3. In an automatic reclosing circuit breaker comprising a plurality of separately-operable pole-units each comprising separable contacts biased toward open position, each pole unit further comprising a trip-free linkage for transmitting closing thrust to its contacts and a trip latch movable to a tripped position to render said linkage ineffective to transmit said closing thrust, common motive means operable to apply closing thrust to any one of said linkages, switch means operable to effect operation of said motive means, a switch controlling member coupled to said switch means, a driving member individual to each of said pole-units and actuable in response to an opening of its particular pole-unit, a lost-motion driving connection between each of said driving members and said switch controlling member for permitting said controlling member to be driven by either of said driving members to operate said switch without affecting the other of said driving members, normally-inoperative lock-out means individual to each of said pole-units and effective when operative to hold the latch of its corresponding pole unit in a tripped position and to render the driving member of its corresponding pole unit incapable of responding to opening of said corresponding pole unit, and integrating means individual to each of said pole units for rendering operative the lock-out means of its particular pole unit in response to a predetermined series of quickly successive operations of said particular pole-unit.

4. In an automatic reclosing circuit breaker comprising a plurality of separately-operable pole-units each comprising separable contacts biased toward open position, each pole-unit further comprising a trip-free linkage for transmitting closing thrust to its contacts and a trip latch movable to a tripped position to render said linkage ineffective to transmit said closing thrust, common motive means operable to apply closing thrust to any one of said linkages, switch means operable to effect operation of said motive means, switch control means individual to each of said pole-units for operating said switch means in response to opening of its associated pole unit, said switch control means including a lost-motion driving connection permitting any one of said switch control means to operate independently of the other of said switch control means, normally-inoperative lock-out means individual to each of said pole-units and effective when operative to hold the latch of its corresponding pole unit in a tripped position and to render its corresponding switch control means unresponsive to opening of said corresponding pole-unit, and integrating means individual to each of said pole units for rendering operative the lock-out means of its particular pole unit in response to a predetermined series of quickly successive operations of said particular pole unit.

5. In an automatic reclosing circuit breaker comprising a plurality of separately-operable pole-units, each unit comprising separable contacts and means for opening said contacts in response to predetermined circuit conditions, a stored-energy closing device common to all of said pole units, means responsive to discharge of said device for reclosing any one said pole units after opening thereof, motive means operable upon energization to charge said stored-energy device and to oppose discharge thereof and operable upon deenergization to enable said stored-energy device to discharge, switch means movable from a non-operated to an operated position to effect energization of said motive means and returnable to said non-operated position to deenergize said motive means, switch control means responsive to opening of any one of said pole units for moving said switch means into its operated position to cause said motive means to charge said spring, means responsive to a predetermined charging operation for restoring said switch means to its non-operated position thereby deenergizing said motive means and enabling said stored energy device to discharge, and holding means blocking another movement of said switch means into its operated position until said device has discharged to reclose the pole-unit which had opened to initiate motive means operation.

6. In an automatic reclosing circuit breaker comprising a plurality of separately-operable pole-units, each unit comprising separable contacts and means for opening said contacts in response to predetermined circuit conditions, a stored-energy closing device common to all of said pole-units, means responsive to discharge of said device for reclosing any one said pole units after opening thereof, motive means operable upon energization to charge said stored-energy device and to oppose discharge thereof and operable upon deenergization to permit said stored-energy device to discharge, switch means movable from a non-operated to an operated position to effect energization of said motive means and returnable to said non-operated position to deenergize said motive means, switch control means responsive to opening any one of said pole units for moving said switch means into its operated position to cause said motive means to charge said spring, means responsive to a predetermined charging operation for restoring said switch means to its non-operated position thereby deenergizing said motive means and enabling said stored energy device to discharge, and holding means blocking another movement of said switch means into its operated position while said device is discharging to close a previously-opened pole unit, and means for disabling said holding means in response to completion of said reclosing operation.

7. The combination of claim 6 in which said holding means comprises a latch which acts to hold said switch means in its non-operated position during the major portion of said reclosing operation.

8. In an automatic reclosing circuit breaker comprising breaker comprising a plurality of separately-operable pole-units, each unit comprising separable contacts and means for opening said contacts in response to predetermined circuit conditions, a stored-energy closing device common to all of said pole-units, means responsive to discharge of said device for reclosing any one of said units after opening thereof, motive means operable to charge said device and to oppose discharge of said device during operation of said motive means, switch means operable in one sense to initiate operation of said motive means, switch control means responsive to opening of any one of said pole-units for operating said switch means in said one sense thereby to initiate a charging operation by said motive means, means responsive to said charging operation for operating said switch means in an opposite sense to discontinue operation of said motive means thereby initiating discharge of said device, and holding means blocking another operation of said switch means in said one sense until said spring has discharged sufficiently to reclose the pole-unit which had opened to initiate operation of said motive means.

9. In an automatic reclosing circuit breaker comprising separable contacts which are opened and reclosed a predetermined number of times in response to predetermined electrical conditions, a trip-free linkage operatively connected to one of said contacts, a latch coacting with said linkage and operable in a reset position to render said linkage capable of transmitting contact-closing force to said one contact, said latch being movable from said reset position to a tripped position to render said linkage incapable of transmitting contact-closing force to said one contact, means for initiating each of said contact-opening operations by moving said latch from said reset position to said tripped position, latch-resetting means operable in response to a contact opening operation for automatically returning said latch to said reset position, motive means normally operable in response to a contact-opening operation for supplying a contact-closing force to said linkage after resetting of said latch whereby to reclose said contacts, normally-inoperative lock-out means effective when operative to hold said latch in said tripped position thereby preventing reclosure of said contacts by said motive means, and means for rendering operative said lock-out means in response to a predetermined number of quickly successive operations of said circuit breaker, said lockout means acting to hold said latch in a tripped position despite a subsequent operation of said motive means, thereby precluding said contacts from being closed by said subsequent operation of said motive means.

10. In an automatic reclosing circuit breaker comprising separable contacts which are opened and reclosed a predetermined number of times in response to predetermined electrical conditions, a trip-free linkage operatively connected to one of said contacts, a latch coacting with said linkage and operable in a reset position to render said linkage capable of transmitting contact-closing force to said one contact, said latch being movable from said reset position to a tripped position to render said linkage incapable of transmitting contact-closing force to said one contact, means for initiating each of said contact-opening operations by moving said latch from said reset position to said tripped position, latch-resetting means operable in response to a contact-opening operation for automatically returning said latch to said reset position, motive means normally operable in response to a contact-opening operation for supplying a contact-closing force to said linkage after resetting of said latch whereby to reclose said contacts, normally-inoperative lock-out means effective when operative to hold said latch in said tripped position thereby preventing reclosure of said contacts by said motive means, means for rendering operative said lock-out means in response to a predetermined number of quickly successive opening operations of said circuit breaker, said lockout means acting to hold said latch in a tripped position despite a subsequent operation of said motive means, thereby precluding said contacts from being closed by said subsequent operation of said motive means, and normally inoperable anti-pump means rendered operable in response to said predetermined number of quickly successive opening operations for rendering said motive means unresponsive to a contact-opening operation.

11. In an automatic reclosing circuit breaker comprising separable contacts which are opened and reclosed a predetermined number of times in response to predetermined electrical conditions, a trip-free linkage operatively connected to said contacts and operable when in a reset condition to transmit closing force to said contacts, means for initiating each of said opening operations by a tripping operation which renders said linkage ineffective to transmit closing force to said contacts, motive means for supplying a contact-reclosing force following a contact-opening operation, means normally operable to reset said linkage after opening of said contacts whereby to render said linkage effective to transmit reclosing force to said contacts, normally-inoperative lock-out means effective when operative to disable said resetting means thereby preventing resetting of said linkage and consequently preventing reclosure of said contacts by said motive means, and means for rendering operative said lock-out means in response to a predetermined number of quickly successive operations of said circuit breaker, said lockout means acting to hold said latch in a tripped position despite a subsequent operation of said motive means, thereby precluding said contacts from being closed by said subsequent operation of said motive means.

12. In an electric circuit breaker comprising a plurality of separately-operable pole units each comprising separable contacts and means biasing said contacts toward open position, each pole-unit further comprising a trip-free linkage operable when tripped to permit opening of said contacts and operable when reset to transmit closing-thrust to said contacts, each pole unit further comprising automatic resetting means biasing its linkage to a reset position after tripping thereof, a stored-energy closing device common to all of said pole-units and dischargeable to supply a closing thrust to any of said linkages, motive means operable upon energization to charge said device and operable upon deenergization to enable said device to discharge, means responsive to opening of any one of said pole-units for effecting energization of said motive means to charge said device, means controlled by said charging operation for blocking said automatic resetting means from resetting the linkage of any pole-unit which had previously been tripped open until after said charging operation has at least partially charged said closing device and thereafter allowing said automatic resetting means to reset said linkage, means for deenergizing said motive means after a predetermined charging operation sufficient to reset said linkage whereby to cause said stored-energy device to discharge and supply a contact-reclosing force, and means for transmitting said closing force to the then-reset linkage thereby to close its associated contacts.

13. The circuit breaker of claim 12 in combination with means including a lost-motion connection for preventing any then-closed pole unit from being opened by said resetting action.

14. The circuit breaker of claim 12 in combination with means for maintaining any non-tripped pole unit in closed position during said resetting action.

15. In a polyphase automatic reclosing circuit breaker comprising contacts separable to open at least one of said phases, means biasing said contacts toward open position, latch means normally holding said contacts closed, means responsive to predetermined circuit conditions for releasing said latch means to effect opening of said contacts, a chargeable spring which is dischargeable to reclose said contacts after opening thereof, normally-deenergized electroresponsive means operable upon energization to charge said spring and operable upon deenergization to enable said spring to discharge and supply a contact reclosing force, switch means responsive to a contact-opening operation for connecting said electroresponsive means across two of said phases thereby energizing said electroresponsive means to produce a spring-charging operation thereof, and means for deenergizing said electroresponsive means after a spring-charging operation for causing said spring to discharge to reclose said contacts.

16. In a polyphase automatic reclosing circuit breaker comprising contacts separable to open at least one of said phases, means biasing said contacts toward open position, latch means normally holding said contacts closed, means responsive to predetermined circuit conditions for releasing said latch means to effect opening of said contacts, a chargeable spring which is dischargeable to reclose said contacts after opening thereof, force-transmitting means operable during a spring-discharging operation to transmit closing thrust from said spring to said contacts but inoperable during a spring-charging operation to transmit closing thrust to said contacts, normally-deenergized electroresponsive means operable upon energization to charge said spring, switch means responsive to a contact-opening operation for connecting said electroresponsive means across two of said phases thereby energizing said electroresponsive means to produce a spring-charging operation thereof, and means for discharging said spring after said charging operation thereby reclosing said contacts by closing thrust transmitted through said force-transmitting means.

17. In an electric circuit breaker having separable contacts, means biasing said contacts toward open position, a trip-free linkage coupled to one of said contacts and adapted to transmit closing thrust to said one contact, a cam member which is movable from a reset to a closed position to apply closing thrust to said trip-free linkage, an actuating arm for said cam member movable relative thereto from a reset into a closed position to produce a wedging action which drives said cam member into its closed position, motive means for supplying closing power to drive said actuating arm into its closed position, and detent means between said arm and said cam member for maintaining said arm and cam member in their respective closed positions even when the application of closing power has been discontinued whereby then to hold said linkage and said contacts in closed position.

18. In an electric circuit breaker having separable contacts, means biasing said contacts toward open position, a trip-free linkage coupled to one contact and adapted to transmit closing thrust to said one contact, a cam member which is movable from a reset to closed position to apply closing thrust to said trip-free linkage, an actuating arm for said cam member movable relative thereto from a reset into a closed position to produce a wedging action which drives said cam member into its closed position, motive means for supplying closing power to drive said actuating arm into its closed position, resetting means biasing said cam member and said actuating arm toward their respective reset positions, detent means between said arm and said cam member operable when said trip-free linkage is in a closed position to maintain said arm and cam member in their respective closed positions even when the application of closing power has been discontinued, said resetting means being sufficiently strong to overcome the restraint of said detent means when said linkage is tripped and the application of closing power to the actuating arm is discontinued whereby said resetting means is then effective to restore said cam member and said actuating arm to their respective reset positions.

19. In an automatic reclosing circuit breaker comprising a plurality of pole units; each pole unit comprising a pair of separable contacts, means biasing one of said contacts toward open position, a trip-free linkage coupled to said one contact and adapted to transmit closing thrust to said one contact, a cam member which is movable from a reset to closed position to apply closing thrust to said trip-free linkage, and an actuating arm for said cam member movable relative thereto from a reset into a closed position to produce a wedging action which drives said cam member into its closed position; motive means including a driving shaft common to all of said actuating arms for applying closing power to any one of said arms which is initially in a reset position, resetting means individual to each pole unit for biasing the cam member and actuating arm of that particular pole unit toward their respective reset positions, detent means between each cooperating arm and cam member operable when its associated trip-free linkage is in a closed position to maintain said arm and cam member in their respective closed positions even when the application of closing power has been discontinued, a lost motion coupling between said driving shaft and each of said arms permitting said shaft to be rotated to a reset position without moving said arm out of its closed position, said resetting means being sufficiently strong to overcome the restraint of its associated detent means when said linkage is in a tripped condition and said shaft is rotated to its reset position, whereby said resetting means is then effective to restore said cam member and said actuating arm to their respective reset positions.

20. In an electric circuit breaker having separable contacts, a trip-free linkage coupled to one of said contacts, latch means operable when latched to maintain said linkage in a condition for transmitting closing power to said one contact and operable when unlatched to render said linkage ineffective to transmit said closing power, automatic resetting means biasing said linkage and said latch means to a latched position after unlatching thereof, an input member for applying closing power to said linkage, a chargeable spring which is dischargeable to provide said closing power, means for causing said input member to apply closing power to said linkage in response to discharge of said spring irrespective of the stored energy level of said spring at the instant discharge is initiated, motive means energizable to charge said spring at least to a predetermined energy level at which said spring when discharged will provide sufficient power to close said contacts against fault currents, said motive means acting to oppose spring-discharge as long as energized and being operable when deenergized to cause said spring to discharge, and means for temporarily blocking operation of said automatic resetting means by maintaining said latch means unlatched until said motive means has charged said spring to said predetermined energy level whereby to insure that said one contact will not be driven toward closed position unless sufficient closing power is available to complete said closing operation.

21. In an electric circuit breaker having separable contacts, a trip-free linkage coupled to one of said contacts, latch means operable when latched to maintain said linkage in a condition for transmitting closing power to said one contact and operable when unlatched to render said linkage ineffective to transmit said closing power, an input member movable in one general direction to apply closing power to said linkage, a chargeable spring which is dischargeable to provide said closing power, means for driving said input member in said one general direction and for causing closing power to be applied to said linkage in response to discharge of said spring irrespective of the stored energy level of said spring at the instant discharge is initiated, motive means energizable to charge said spring at least to a predetermined energy level at which said spring when discharged will provide sufficient power to close said contacts against fault currents, said motive means being operable when deenergized to cause said spring to discharge, normally-ineffective resetting means for restoring said latch means to a latched condition after unlatching thereof, and means responsive to charging of said spring to at least said predetermined energy level for thereafter rendering said resetting means effective to restore said latch means to said latched condition whereby said linkage is then capable of transmitting closing power to said one contact.

22. In an electric circuit breaker having separable contacts, a trip-free linkage coupled to one of said contacts and adapted when reset after tripping to transmit closing power to said one contact, an input member movable in one general direction to apply closing power to said linkage, a chargeable spring which is dischargeable to provide said closing power, means for driving said input member in said one general direction and for causing said input member to apply closing power to said linkage in response to discharge of said spring irrespective of the stored energy level of said spring at the instant discharge is initiated, motive means energizable to charge said spring at least to a predetermined energy level at which said spring when discharged will provide sufficient power to close said contacts against fault currents, means for deenergizing said motive means after said predetermined energy level has been attained and for causing said spring to discharge, normally-ineffective resetting means for resetting said linkage after tripping thereof, and means responsive to charging of said spring to at least said predetermined energy level for rendering said resetting means effective thereafter to reset said linkage whereby said linkage is then capable of transmitting closing power to said one contact.

23. In an electric circuit breaker having separable contacts, a trip-free linkage coupled to one of said contacts, said linkage being operable when tripped to permit opening of said contacts and being operable when reset after tripping to transmit closing power to said one contact, closing means including an essentially stationarily-mounted chargeable spring which is dischargeable to supply closing power to said linkage irrespective of the extent to which the spring is charged at the instant discharge is initiated, motive means energizable to charge said spring at least to a predetermined energy level at which said spring when discharged will provide sufficient power to close said contacts against fault currents, means responsive to charging of said spring at least to said predetermined energy level for deenergizing said motive means to cause spring discharge, normally-ineffective resetting means for resetting said linkage after tripping thereof, and means responsive to charging of said spring at least to said predetermined energy level for thereafter rendering said resetting means effective to reset said linkage whereby said linkage is then capable of transmitting closing power to said one contact.

24. In an automatic reclosing circuit breaker having separable contacts, means for opening said contacts in response to a predetermined circuit condition, means for automatically reclosing said contacts following opening thereof, lock-out means including a lock-out member movable along a longitudinally-extending path and effective when held in a predetermined longitudinal position to prevent automatic reclosing of said contacts; means for moving said lock-out member along said path from a reset position to said predetermined longitudinal position each time an opening operation is initiated, means normally returning said member to said reset position following each of said opening operations, an abutment for holding said lock-out member in said predetermined longitudinal position when said member is shifted laterally into interfering relationship therewith, biasing means urging said member to shift laterally into interfering relationship with said abutment when said member is moved into said predetermined longitudinal position, guide means normally maintaining said member out of interfering relationship with said abutment, integrating means responsive to a predetermined number of quickly successive opening operations for disabling said guide means and permitting said biasing means to shift said lock-out member laterally into interfering relationship with said abutment when said member is moved into said predetermined longitudinal position whereby to then prevent automatic reclosure of said contacts.

25. In an automatic reclosing circuit breaker having separable contacts, means for opening said contacts in response to a predetermined circuit condition, means for automatically reclosing said contacts following opening thereof, lock-out means including a lock-out member effective when held in a predetermined general position to prevent reclosing of said contacts, means for moving said lock-out member into said predetermined general position each time an opening operation is initiated, means normally moving said lock-out member out of said position following each of said opening operations, an abutment for holding said lock-out member in said predetermined general position when said abutment interferes with said member, biasing means urging said member to shift into interfering relationship with said abutment, guide means normally maintaining said member out of interfering relationship with said abutment, integrating means responsive to a predetermined number of quickly successive opening operations for disabling said guide means and permitting said biasing means to shift said lock-out member into interfering relationship with said abutment when said lock-out member is moved into said predetermined general position whereby to then prevent automatic recloscure of said contacts.

26. In an automatic reclosing circuit breaker having separable contacts, means for opening said contacts in response to a predetermined circuit condition, means for automatically reclosing siad contacts following opening thereof, lock-out means including a lock-out member effective when held in a predetermined general position to prevent automatic reclosure of said contacts, means for moving said lock-out member into said predetermined general position each time an opening operation is initiated, means normally moving said lock-out member out of said position following each of said opening operations, an abutment for holding said lock-out member in said predetermined general position when said abutment interferes with said member, guide means normally maintaining said member out of interfering relationship with said abutment, integrating means responsive to a predetermined number of quickly successive opening operations for causing said guide means to effect shifting of said lock-out member into interfering relationship with said abutment when said member is moved into said predetermined general position whereby to then prevent automatic reclosure of said contacts.

27. In an automatic reclosing circuit breaker of the type comprising separable contacts, means for automatically opening said contacts to interrupt the circuit in response to a predetermined circuit condition and means for automatically closing said contacts following a circuit interrupting operation, the combination of normally-inactive lock-out means comprising a controlling member having a normal position wherein it is inoperative to prevent automatic reclosing of said contacts, said controlling member adapted when displaced from said normal position by a predetermined first amount to prevent automatic reclosing of said contacts after automatic opening thereof, said controlling member being further adapted when displaced from said normal position by a predetermined second amount greater than said first amount to initiate opening of said contacts and to prevent automatic reclosing thereof, integrating means responsive to a predetermined series of quickly successive contact-opening operations for displacing said lock-out controlling member by said predetermined first amount whereby to prevent automatic reclosing after said series of operations, and manually-operable means for selectively displacing said lock-out controlling member either by said predetermined first amount or by said predetermined second amount.

28. In an automatic reclosing circuit breaker of the type comprising separable contacts, means for automatically opening said contacts to interrupt the circuit in response to a predetermined circuit condition and means for automatically closing said contacts following a circuit interrupting operation, the combination of normally-inactive lock-out means comprising a controlling member having a normal position wherein it is inoperative to prevent automatic reclosing of said contacts, said controlling member adapted when displaced from said normal position by a predetermined first amount to prevent automatic reclosing of said contacts after automatic opening thereof, said controlling member being further adapted when displaced from said normal position by a predetermined second amount greater than said first amount to initiate opening of said contacts and to prevent automatic reclosing thereof, integrating means responsive to a series of quickly successive contact-opening operations for displacing said lock-out controlling member by said predetermined first amount whereby to prevent automatic reclosing after said series of operations, and manually-operable means for said controlling member selectively movable into a first position to displace said controlling member from its normal position by said first amount whereby to cause the breaker to lock-out on its first automatic opening operation thereafter, said manually-operable means being selectively movable to a second position for displacing said controlling member by said second predetermined amount whereby to initiate an opening operation of the breaker.

29. The circuit breaker of claim 28 in combination with the detent means for restraining the manually operable means in said first position.

30. In an automatic reclosing circuit breaker of the type comprising separable contacts, means for automatically tripping open said contacts to interrupt the circuit in response to a predetermined circuit condition and means for automatically closing said contacts following a circuit interrupting operation; a manually-operable breaker-controlling member having a normal position, a tripping position, and an intermediate position located therebetween; means operable when said member is in its normal position for locking open said contacts in response to a predetermined number of quickly successive automatic breaker operations, means responsive to movement of said member into said intermediate position for causing said contacts to lock open in response to a number of automatic breaker operations different than said predetermined number, means responsive to movement of said member into said tripping position for tripping open said contacts, means for temporarily positively blocking the movement of said controlling member in said intermediate position during movement thereof from said normal toward said tripping position whereby to require hesitation in said intermediate position prior to continuation of movement toward said tripping position.

31. In an automatic reclosing circuit breaker of the type comprising separable contacts, means for automatically tripping open said contacts to interrupt the circuit in response to a predetermined circuit condition and means for automatically closing said contacts following a circuit interrupting operation; a manually-operable breaker-controlling member having a normal position, a tripping position, and an intermediate position located therebetween; means operable when said member is in its normal position for locking open said contacts in response to a predetermined number of quickly successive automatic breaker operations, means responsive to movement of said member into said intermediate position for causing said contacts to lock open in response to a number of automatic breaker operations different than said predetermined number, means responsive to movement of said member into said tripping position for tripping open said contacts.

32. In an automatic reclosing circuit breaker of the type comprising separable contacts, means for automatically tripping open said contacts to interrupt the circuit in response to a predetermined circuit condition and means for automatically closing said contacts following a circuit interrupting operation; a manuually-operable breaker-controlling member having a normal position, a tripping position, and an intermediate position located therebetween; means operable when said member is in its normal position for locking open said contacts in response to a predetermined number of quickly successive automatic breaker operations, means responsive to movement of said member into said intermediate position for causing said contacts to lock open in response to a number of automatic breaker operations different than said predetermined number, means responsive to movement of said member into said tripping position for tripping open said contacts, interference means for positively blocking the movement of said controlling member in said intermediate position during forward movement thereof from said normal toward said tripping position, means responsive to predetermined reverse movement of said controlling member from said intermediate position toward said normal position for rendering said interference means ineffective to block the forward movement of said controlling member whereby forward movement thereof may be continued after said reverse movement.

33. In a circuit interrupter, a plurality of pairs of separable contacts, an operating mechanism for said contacts, stored energy means operable to actuate the mechanism to open said contacts, releasable means preventing operation of said stored energy means, current actuated means responsive to current above a predetermined value operable to actuate said releasable means, delay means operable to delay operation of said current actuated means and normally disconnected from the current actuated means, and means actuated by the stored energy means to effect connection of the delay means to the current actuated means.

34. In a recloser, separable contacts, an operating mechanism for said contacts, operating means including a lever connected to the mechanism and biased by a spring to effect separation of said contacts, releasable means opposing movement of said lever to separate the contacts, a current actuated relay having a coil connected in series with the contact and a movable armature connected to effect release of the releasable means, delay means operable to delay operation of the relay and normally disconnected from the relay, and means actuated by the operating means operable to connect the delay means to said armature to delay movement of said armature on predetermined ones of a series of operations.

35. In a recloser; separable contacts; an operating mechanism for said contacts; operating means including a lever connected to the mechanism, a spring biasing the lever to effect separation of the contacts, latch means preventing movement of the lever to effect such separation, and reclosing means operable to actuate the lever against the bias of said spring to reclose the contacts following a separation; current actuated means operable in response to current above a predetermined value through said contacts to release said releasable means; delay means normally disconnected from the current actuated means; means releasably connecting the delay means and the current actuated means; and counting means actuated by operation of the recloser to effect operation of the releasable connecting means to connect the delay means and current actuated means on selected ones of a series of closely successive operations.

36. In an automatic recloser, a plurality of pairs of separable contacts, operating mechanism for each of said pairs, operating means for said mechanisms including spring means biasing the mechanisms to separate said pairs of contacts, releasable means preventing operation of the spring to separate the contacts, a current actuated relay individual to each pair of contacts operable to effect release of said releasable means in response to current through its associated contacts in excess of a predetermined value, delay means operable to delay operation of each relay and normally disconnected from each relay, means operable to actuate the operating means to close the contacts following separation, counting means actuated by the operating means, means actuated by the counting means to connect the delay means to the relays to render the delay means operable, and means operated by the counting means to render the closing means ineffective after a predetermined count of closely successive openings.

37. An automatic recloser, comprising: separable contacts; means controlling the contacts including means operable to separate the contacts in response to an overload condition and including means operable to automatically reclose the contacts following a contact separation operation; means operable to lock the contact controlling means in a contact separation condition; means in response to a predetermined number of operations of the contact control means to operate the lock means; a control shaft; means responsive to a first movement of the control shaft to reset the lock means following a lock operation; means responsive to another movement of the control shaft when the contacts are closed to effect operation of the lock means; and means responsive to yet another operation of the control shaft when the contacts are closed to preset the lock means for operation in response to the first contact separation operation of the contact controlling means occurring after operation of the presetting means.

References Cited by the Examiner
UNITED STATES PATENTS

| | | | |
|---|---|---|---|
| 1,771,421 | 7/30 | Ronnberg | 200—89 |
| 1,853,745 | 4/32 | Rea | 200—89 |
| 1,969,576 | 8/34 | Paxton | 200—92 |
| 2,034,146 | 3/36 | Linde | 200—89 |
| 2,068,553 | 1/37 | Linde | 200—89 |
| 2,269,604 | 1/42 | Schwager | 200—89 |
| 2,298,143 | 10/42 | May | 200—89 |
| 2,333,459 | 11/43 | Atwood | 200—92 |
| 2,411,366 | 11/46 | Chubbuck | 317—24 |
| 2,534,115 | 12/50 | Favre | 317—136 X |
| 2,612,574 | 9/52 | Wyman | 200—89 |
| 2,696,536 | 12/54 | Coggeshall | 200—89 |
| 2,748,221 | 5/56 | Edwards | 200—98 |

SAMUEL BERNSTEIN, *Primary Examiner.*

MAX L. LEVY, JOHN P. WILDMAN, *Examiners.*